United States Patent [19]
Lacefield

[11] 3,821,401
[45] June 28, 1974

[54] 3,5-DIACYLOXYBENZOIC ACIDS USED AS ANTI-INFLAMMATORY AGENTS
[75] Inventor: William B. Lacefield, Indianapolis, Ind.
[73] Assignee: Eli Lilly and Company, Indianapolis, Ind.
[22] Filed: Sept. 13, 1971
[21] Appl. No.: 180,161

[52] U.S. Cl. .............................. 424/308, 424/311
[51] Int. Cl. ............................................ A61k 27/00
[58] Field of Search .................. 424/308, 317, 311

[56] References Cited
UNITED STATES PATENTS
3,674,870   7/1972   Ruyle et al. .................... 424/230

OTHER PUBLICATIONS
Tanari et al., J. Pharm. Pharmacol. Vol. 16, 634 (1964).

Negwer, "Organisch–Chemische Arzneimittel und Ihre Synonyma," 3rd. Ed. Akademie Verlag, pp. 240–241.

Merck Index, 11th Ed., 1968, p. 894.

Primary Examiner—Albert T. Meyers
Assistant Examiner—Leonard Schenkman
Attorney, Agent, or Firm—Kathleen R. Schmoyer; Everet F. Smith

[57]  ABSTRACT

Methods employing and compositions comprising specified 3,5-diacyloxybenzoic acids or their derivatives as anti-inflammatory agents.

8 Claims, No Drawings

3,5-DIACYLOXYBENZOIC ACIDS USED AS ANTI-INFLAMMATORY AGENTS

BACKGROUND OF THE INVENTION

Inflammatory disorders such as arthritis and rheumatism, which cause continuing pain and eventual debilitation, are well known. Many anti-inflammatory agents are in current use, including steroids, salicylates, pyrazolidines and sodium aurothiomalate. Because the need for treatment is often prolonged, the toxic effects of these agents are of great concern. The search continues, therefore, for improved methods of treating these ubiquitous disorders.

The anti-inflammatory activity of benzoic acid derivatives has been considered limited to those compounds having an acyloxy or hydroxyl function in a position ortho to the carboxylic acid (salicylate derivatives). It is surprising, therefore, to find that the compounds of the present invention, which lack these ortho functions, are anti-inflammatory agents. Indeed, the compounds of the present invention are advantageous in that they do not exhibit some of the undesirable side effects of hitherto known anti-inflammatory agents. Furthermore, it is believed from pharmacological tests of oxidative phosphorylation and platelet aggregation that the compounds operate by a mode of action unlike that of aspirin and other non-steroidal anti-inflammatory agents.

SUMMARY OF THE INVENTION

The present invention relates to a method of treating inflammation and its concomitant swelling, fever and ossification in warm-blooded animals. More particularly, this invention provides a method of treating inflammatory disorders which comprises administering to a warm-blooded animal from 5 to 100 mg./kg. of animal body weight of a benzoic acid derivative represented by the formula

I

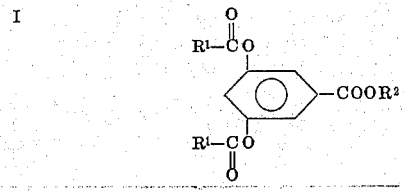

In the above and succeeding formulae of the present specification and claims, each $R^1$ independently represents lower alkyl of $C_1$–$C_4$, straight or branched; and $R^2$ represents hydrogen; lower alkyl of $C_1$–$C_3$, straight or branched; ammonium; or a pharmacologically acceptable moiety selected from the group consisting of alkali metal and alkaline-earth metal.

This invention also provides pharamaceutical formulations containing one or more of the above-described compounds in unit-dosage form for treating inflammatory conditions.

DETAILED DESCRIPTION OF THE INVENTION

Some of the compounds represented by the above formula are known in the art (i.e., Beilstein, II, Vol. 10, p. 267). All of the compounds employed in the practice of this invention are prepared by methods known in the art from known starting materials. Those of the compounds wherein $R^2$ represents hydrogen or lower alkyl are prepared by reacting in a suitable solvent the appropriate acid anhydride and either 3,5-dihydroxybenzoic acid or the appropriate ester thereof.

The resulting products where $R^2$ represents hydrogen can be reacted further to obtain the corresponding ammonium, alkali-metal, and alkaline-earth-metal salts. In such further reaction, the prepared compound is reacted with a stoichiometric amount of a suitable base to procure the corresponding salt. These reactions are of a type well known in the art, and the particular steps employed to prepare the present salts are carried out in accordance with these well-known procedures. Alkali metals and alkaline-earth metals which are pharmacologically acceptable for utilization in the present invention include sodium, potassium, calcium, aluminum and magnesium.

Examples of compounds useful in the practice of this invention are 3,5-diacetoxybenzoic acid
3,5-diacetoxybenzoic acid, calcium salt
ethyl 3,5-diacetoxybenzoate
3,5-diacetoxybenzoic acid, ammonium salt
3,5-di(propionyloxy)benzoic acid
propyl 3,5-di(propionyloxy)benzoate
3,5-di(butyryloxy)benzoic acid
methyl 3,5-di(butyryloxy)benzoate
3-acetoxy-5-(butyryloxy)benzoic acid
3,5-di(isobutyryloxy)benzoic acid
3,5-di(valeryloxy)benzoic acid
ethyl 3,5-di(isobutyryloxy)benzoate
3,5-diacetoxybenzoic acid, sodium salt The following examples illustrate the synthesis of the compounds to be employed in accordance with the present invention.

EXAMPLE 1

Preparation of 3,5-diacetoxybenzoic acid

A solution of 100 g. of 3,5-dihydroxybenzoic acid in 200 ml. of acetic anhydride was cooled in an ice bath during the dropwise addition of 100 ml. of pyridine. The resulting solution was stirred overnight at room temperature and then poured into ice water. Concentrated hydrochloric acid was added until the solution became acidic. The product was collected by filtration and recrystallized from an ethanol-water (1:1) mixture to give 111.8 g. of 3,5-diacetoxybenzoic acid, m.p. 159°–161°C. Elemental analysis calculated for $C_{11}H_{10}O_6$.

| Theory: | C, 55.47; | H, 4.23; | O, 40.30 |
|---|---|---|---|
| Found: | C, 55.65; | H, 4.52; | O, 40.47 |

EXAMPLE 2

Preparation of 3,5-di(isobutyryloxy)benzoic acid

A solution of 100 ml. of isobutyryl chloride in 25 ml. of chloroform was added slowly to a solution of 25 g. of 3,5-dihydroxybenzoic acid in 100 ml. of pyridine. The resulting solution was stirred overnight at room temperature and then poured into ice water. After the solution was acidified by addition of concentrated hydrochloric acid, it was extracted with diethyl ether. The ether extract was washed with water, dried over sodium sulfate, filtered, and evaporated to dryness under vacuum. The residue was recrystallized from ethanol to give 7.2 g. of 3,5-di(isobutyryloxy)benzoic acid, m.p. 152°–155°C. Elemental analysis calculated for $C_{15}H_{18}O_6$.

| Theory: | C, 61.22; | H, 6.17; | O, 32.62 |
| --- | --- | --- | --- |
| Found: | C, 60.90; | H, 6.08; | O, 32.48 |

EXAMPLE 3

Preparation of ethyl 3,5-diacetoxybenzoate

Acetic anhydride (50 ml.) was added to a solution of ethyl 3,5-dihydroxybenzoate (25 g.) in 50 ml. of pyridine. The resulting solution was stirred overnight at room temperature and then poured into ice water. The solution was acidified by addition of concentrated hydrochloric acid and then was extracted with diethyl ether. The ether extracts were washed with water, dried over sodium sulfate, filtered, and evaporated in vacuo. The residue was recrystallized from a benzene-hexane solution, yielding 7.3 g. of ethyl 3,5-diacetoxybenzoate, m. p. 45°–48°C. Elemental analysis calculated for $C_{13}H_{14}O_6$.

| Theory: | C, 58.64; | H, 5.30; | O, 36.06 |
| --- | --- | --- | --- |
| Found: | C, 58.63; | H, 5.27; | O, 35.84 |

EXAMPLES 4–5

The following compounds were prepared according to the method of Example 1 from the corresponding anhydride, using appropriate amounts of 3,5-dihydroxybenzoic acid and pyridine.

3,5-di(propionyloxy)benzoic acid, m.p. 117°–121°C., from propionic anhydride. Elemental analysis calculated for $C_{13}H_{14}O_6$.

| Theory: | C, 58.65; | H, 5.30; | O, 36.05 |
| --- | --- | --- | --- |
| Found: | C, 58.95; | H, 5.51; | O, 35.77 |

3,5-di(butyryloxy)benzoic acid, m.p. 96°–99°C., from butyric anhydride. Elemental analysis calculated for $C_{15}H_{18}O_6$.

| Theory: | C, 61.22; | H, 6.17; | O, 32.62 |
| --- | --- | --- | --- |
| Found: | C, 61.39; | H, 6.45; | O, 32.54 |

In the practice of this invention, one of the anti-inflammatory agents of formula I is administered to a warm-blooded animal in a dose of from about 5 to about 100 mg./kg. of animal body weight. The administration can be repeated periodically as needed. In accordance with general practice, the present anti-inflammatory agent can be administered every 4 to 6 hours. While oral administration is the preferred route of administration, the anti-inflammatory agents disclosed herein can also be administered parenterally or as rectal suppositories.

Preferably, the compounds to be employed in accordance with the present invention are employed in combination with one or more adjuvants suited to the particular route of administration. Thus, in the case of oral administration, the compound is modified with pharmaceutical diluents or carriers such as lactose, sucrose, starch powder, cellulose, talc, magnesium stearate, magnesium oxide, calcium sulfate, acacia powder, gelatin, sodium alginate, sodium benzoate and stearic acid. Such compositions can be formulated as tablets or enclosed in capsules for convenient administration. The compounds can also be mixed with a liquid and administered as elixirs, suspensions, and the like. In the case of parenteral administration, the compound to be used is conveniently formulated in saline to constitute an injectable liquid solution. Other adjuvants and modes of administration are known to those skilled in the art. A preferred formulation is a pharmaceutical preparation in dosage-unit form adapted for administration to obtain an anti-inflammatory effect, comprising per dosage unit a nontoxic, antiphlogistically effective amount within the range from about 50 to about 1000 milligrams of at least one compound of formula I, as defined hereinabove, and a pharmaceutical diluent.

If desired, the pharmaceutical preparations may contain, in addition to the active component of formula I, one or more other pharmacologically active substances, for example, acetylsalicylic acid, $\alpha$-d-propoxyphene, caffeine or acetaminophen (N-acetyl-p-aminophenol).

The following examples illustrate the practice of the present invention.

EXAMPLE 6

Tablet Formulation

| | Mg. |
| --- | --- |
| 3,5-diacetoxybenzoic acid | 350 |
| starch (dried) | 10 |
| silicon dioxide, fumed | 1 |
| cellulose, microcrystalline | 20 |
| magnesium stearate | 5 |
| TOTAL WEIGHT | 386 |

The above ingredients are blended and then compressed by a suitable tablet machine to produce a tablet weighing typically 386 mg. and equivalent to 350 mg. of 3,5-diacetoxybenzoic acid. The tablet may be scored so that half or a quarter of this dosage may be taken.

EXAMPLE 7

Capsule Formulation

| | Mg. |
| --- | --- |
| 3,5-diacetoxybenzoic acid | 350 |
| starch (dried) | 125 |
| TOTAL WEIGHT | 475 |

The 3,5-diacetoxybenzoic acid is mixed with dried starch in a suitable mixer to produce a homogenous powder. The powder is packed into size O gelatin capsules, each holding 475 mg. of powder, equivalent to 350 mg. of drug. Other ingredients may be added, according to the art, for the purpose of improving the performance of processing machines, assisting in disintegration of the unit dose, improving compactibility, etc.

EXAMPLE 8

Anti-inflammatory effect of 3,5-diacetoxybenzoic acid on ultraviolet-induced erythema in guinea pigs The effect of an orally administered suspension of 3,5-diacetoxybenzoic acid (25 mg.) in methyl cellulose (Methocel, Dow) on the development of ultraviolet-induced erythema on albino guinea-pig skin was evaluated.

METHOD

A modification of the Winder method was used to measure the anti-inflammatory activity of this agent (Winder, C. V.; Wax, J.; Burr, V.; Been, M.; and Posiere, C. E.: A Study of Pharmacological Influences on Ultraviolet Erythema in Guinea Pigs. Arch. Int. Pharmacodyn. 116: 261, 1958). Albino guinea pigs of either sex, weighing 225–300 grams, were shaved on the back and chemically depilated 18–20 hours before exposure to ultraviolet light (Nair, Lotion Hair Remover, Carter Products, N.Y., N.Y.). The animals were fasted overnight. Immediately after the guinea pigs were treated with the test compound, a gummed notebook paper reinforcement was placed on their backs, and they were exposed to a high intensity ultraviolet light for 7 seconds. The ultraviolet light source, a Hanovia Lamp (Kromayer-Model 10), was placed in contact with the skin of the guinea pig's back. After exposure, the reinforcements were removed, and the back was wiped clean with a water-soaked gauze sponge. The unexposed area under the reinforcement provided an area of contrast for grading the erythema. The animals were randomized and placed in clear-plastic partitioned holders 10 × 20 cm. wide and 15 cm. high. Beginning one hour after exposure and thereafter at half-hour intervals for another 1½ hours, the degree of resulting erythema was graded by an arbitrary scoring system based upon the degree of contrast and redness formed. Anti-inflammatory agents delay the development of the erythema and have their greatest effect at the initial grading periods. The scores were, therefore, weighted by factors of 4,3,2, and 1 at the 1.0, 1.5, 2.0, and 2.5 hour scoring times, respectively. The erythema was graded as follows:

ERYTHEMA SCORING SYSTEM

| Score | Appearance of Exposed Area |
| --- | --- |
| 0 | No redness and no contrast |
| 1 | Slight redness with a faint reinforcement outline |
| 2 | Slight to moderate redness with a distant outline |
| 3 | Marked redness with a distinct circular outline |

Total scores from each treatment group of four guinea pigs were compared to the control treatment and the percent inhibition, calculated as follows:

100 × Control-Treatment/Control = Percent Inhibition

RESULT

When 3,5-diacetoxybenzoic acid was evaluated by the foregoing method at a dose of 25 mg./kg., it produced a 50 percent inhibition of the erythemic response ($ED_{50}$).

EXAMPLES 9–12

Anti-inflammatory effects on ultraviolet-induced erythema in guinea pigs

Each of the agents listed below was also evaluated for anti-inflammatory effect. For these tests a suspension of 50 mg. of compound in methyl cellulose (Methocel, Dow) was administered to albino guinea pigs. The guinea pigs were tested and evaluated by the procedure described in Example 8. The percent inhibition effected by each of these agents, as determined by this procedure, is shown below.

|  | Percent Inhibition |
| --- | --- |
| Ethyl 3,5-diacetoxybenzoate | 50 |
| 3,5-di(propionyloxy)benzoic acid | 24 |
| 3,5-di(butyryloxy)benzoic acid | 50 |
| 3,5-di(isobutyryloxy)benzoic acid | 36 |

EXAMPLE 13

Anti-inflammatory effect of 3,5-diacetoxybenzoic acid on adjuvant-induced arthritis in rats One of the most significant of the animal testing systems to evaluate effects of anti-inflammatory agents is that in which arthritis is induced in rats by mycobacterial adjuvant. (B. B. Neubould, Brit. J. Pharmacol., Vol. 21, pp. 127–136, 1963). In many ways this adjuvant-induced arthritis is analogous to arthritis in man.

METHOD

Male, specific pathogen-free albino rats, weighing approximately 200 g., were used. The arthritic syndrome was induced by intradermal injection of 0.05 ml. of a fine suspension of dead *Mycobacterium tuberculosum* bacilli in mineral oil (concentration 5 mg./ml.) through a needle into the plantar surface of the right hind foot. The tubercle bacilli were derived from human strains PN, DT and C which were grown for eight weeks, killed by steam and dried in a vacuum oven.

One day before injection of adjuvant and daily thereafter for thirteen days, a suspension of 50 mg. of 3,5-diacetoxybenzoic acid in sodium carboxymethylcellulose was administered orally to rats. In control rats an inflamed swelling was induced which reached its maximum size in about three days. Thereafter, swelling slowly subsided until about the eighth day when the feet again began to swell. Inflamed lesions occurred after about the 10th day.

A measurement of the edema of the tested rats was made by dipping the rat's foot into a well, displacing mercury. The pressure from the mercury was transferred into electrical output by a Digital Volumetric Measurement System, using a transducer. The paw volume was measured on the day adjuvant was administered (day two) and again on day seven and day fourteen of the test. The initial (day two) volume was subtracted from the volumes on the seventh and on the fourteenth days, and the percent volume increases, relative to control animals evaluated in the same manner, were calculated. All readings and measurements were done in blind studies. The activity of 3,5- diacetoxybenzoic acid measured by this test is shown below:

| Dose (mg./kg.) | Percent Inhibition of Volume Increase | | |
|---|---|---|---|
| | Day 2 | Day 7 | Day 14 |
| 100 | 0 | 44 | 66 |
| 50 | 0 | 12 | 16 |

In addition, and of greater importance, X-ray photographs of the foot bones of both treated and control rats were taken with a Pickard X-ray camera after three weeks and after five weeks (one and three weeks after cessation of drug administration, respectively). Visual readings of the photographs obtained were made, and ratings were given according to the degree of bone destruction observed. The rating scale is from zero (minimal damage) to five (severe bone damage).

Minimal bone damage was obtained in tests with 3,5-diacetoxybenzoic acid and was observed as follows.

| Dose (mg./kg.) | X-Ray Damage Rating | |
|---|---|---|
| | 3 weeks | 5 weeks |
| 100 | .16 | .33 |
| 50 | .50 | 1.00 |
| Control | 1.10 | 2.70 |

I claim:

1. A method of treating inflammation which comprises administering orally to a warm-blooded animal an antiphlogistically effective, nontoxic amount of a compound of the formula

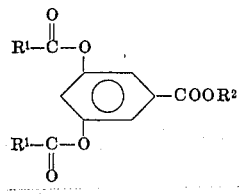

wherein each $R^1$ independently represents lower alkyl of $C_1$–$C_4$, straight or branched; and $R^2$ represents hydrogen; lower alkyl of $C_1$–$C_3$, straight or branched; ammonium; or a pharmacologically acceptable moiety selected from the group consisting of alkali metal and alkaline-earth metal.

2. The method of claim 1 in which the compound is administered in a dose of from 50 to 1,000 milligrams of the compound.

3. The method of claim 1 wherein the compound is 3,5-diacetoxybenzoic acid.

4. The method of claim 1 wherein the compound is methyl 3,5-diacetoxybenzoate.

5. The method of claim 1 wherein the compound is ethyl 3,5-diacetoxybenzoate.

6. The method of claim 1 wherein the compound is 3,5-di(butyryloxy)benzoic acid.

7. An anti-inflammatory composition in dosage-unit form for oral administration, comprising per dosage unit an antiphlogistically effective, nontoxic amount within the range from about 50 to about 1,000 milligrams of a compound of the formula

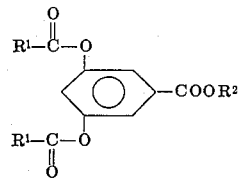

wherein each $R^1$ independently represents lower alkyl of $C_1$–$C_4$, straight or branched; and $R^2$ represents hydrogen; lower alkyl of $C_1$–$C_3$, straight or branched; ammonium; or a pharmacologically acceptable moiety selected from the group consisting of alkali metal and alkaline-earth metal; and a pharmaceutical diluent.

8. The composition of claim 7 wherein the compound is 3,5-diacetoxybenzoic acid.

* * * * *